United States Patent [19]

Nemoto

[11] Patent Number: 4,809,560
[45] Date of Patent: Mar. 7, 1989

[54] KEY-SHIFT TRANSMISSION

[75] Inventor: Shusuke Nemoto, Yao, Japan

[73] Assignee: Kanzaki Kokyukoki Mfg. Co. Ltd., Amagasaki, Japan

[21] Appl. No.: 233,124

[22] Filed: Aug. 17, 1988

[30] Foreign Application Priority Data

Oct. 13, 1987 [JP] Japan .............. 62-156499[U]

[51] Int. Cl.$^4$ .............................. F16H 3/08
[52] U.S. Cl. ........................ 74/371; 74/701; 464/183; 403/340; 29/463
[58] Field of Search ............ 74/371, 701, 740; 29/463, 6; 403/340, 380; 464/179, 183

[56] References Cited

U.S. PATENT DOCUMENTS

| 429,175 | 6/1890 | Ogilvy | 464/183 |
|---|---|---|---|
| 831,416 | 1/1906 | Chalmers | 74/371 |
| 3,599,509 | 8/1971 | Romer | 29/6 X |
| 3,600,962 | 8/1971 | Ivanchich | 74/371 X |
| 3,812,735 | 5/1974 | Von Kaler et al. | 74/371 |
| 4,141,225 | 2/1979 | Varner | 464/179 X |
| 4,656,886 | 4/1987 | Edwards | 74/371 X |
| 4,662,241 | 5/1987 | Edwards | 74/740 X |
| 4,702,120 | 10/1987 | Okada et al. | 74/371 |
| 4,713,983 | 12/1987 | Rundle | 74/371 X |

FOREIGN PATENT DOCUMENTS

| 3229597 | 2/1984 | Fed. Rep. of Germany | 74/371 |
|---|---|---|---|
| 472361 | 5/1914 | France | 74/371 |

*Primary Examiner*—Dirk Wright
*Assistant Examiner*—Douglas Fox

[57] ABSTRACT

A hollow shaft composed of a pair of trough-shaped shaft halves (15A) is employed as a speed-change shaft (15) for a key-shift transmission. Each of the shaft halves includes at both sides of an arched inner surface a pair of axially extending flattened end surfaces one of which has thereon an axially elongated projection (19) and the other of which has therein an axially elongated recess (20). The shaft halves are engaged to each other co-rotatably by fitting the projections of the respective shaft halves into the recesses of the other respective shaft halves. The projections and recesses are sized such that a pair of elongated axial grooves (21) are formed in an outer surface of the change shaft. A pair of shift keys (18) are disposed within such axial grooves for coupling speed-change gears ($16F_1$–$16F_5$) selectively to the change shaft.

5 Claims, 6 Drawing Sheets

KEY-SHIFT TRANSMISSION

FIELD OF THE INVENTION

This invention relates to a key-shift transmission adapted for use in relatively small-sized working vehicles such as self-propelled walking mowers and mower tractors.

BACKGROUND OF THE INVENTION

As well known from, for example, U.S. Pat. No. 3,812,735, a key-shift transmission is fashioned to have a speed-change shaft, a plurality of speed-change gears rotatably mounted on the speed-change shaft, a shifter sleeve slidably mounted on the speed-change shaft, and shift keys co-slidably connected to the shifter sleeve and operable to couple the speed-change gears one at a time to the speed-change shaft and permits multi-stage changes of the vehicle speed in a compact structure so that it is well suited for use in a small-sized working vehicle.

In the past, shift keys for such key-shift transmission have been disposed within elongated axial grooves in the outer surface of a speed-change shaft. For forming such axial grooves, a shaft blank having a relatively large outer diameter is employed which is then processed by broaching so as to form elongated axial grooves in the outer surface.

Such speed-change shaft is relatively large in weight and, therefore, disadvantageous in power transmission purpose. Material coast is relatively high and production coast is further enhanced due to machining for forming the axial grooves.

OBJECTS

Accordingly, a primary object of the present invention is to provide a novel key-shift transmission comprising a speed-change shaft which requires much less amount of material and is thus much lighter than the one according to the prior art and which requires no machining process.

A further object of the present invention is to provide a key-shift transmission which can be fashioned into a compact one by utilizing a structure for reducing weight of the speed-change shaft.

BRIEF DESCRIPTION OF THE DRAWINGS

Other objects and advantages of the invention will become readily apparent as the specification is considered in conjunction with the accompanying drawings, in which.

SUMMARY OF THE INVENTION

Figure 1:
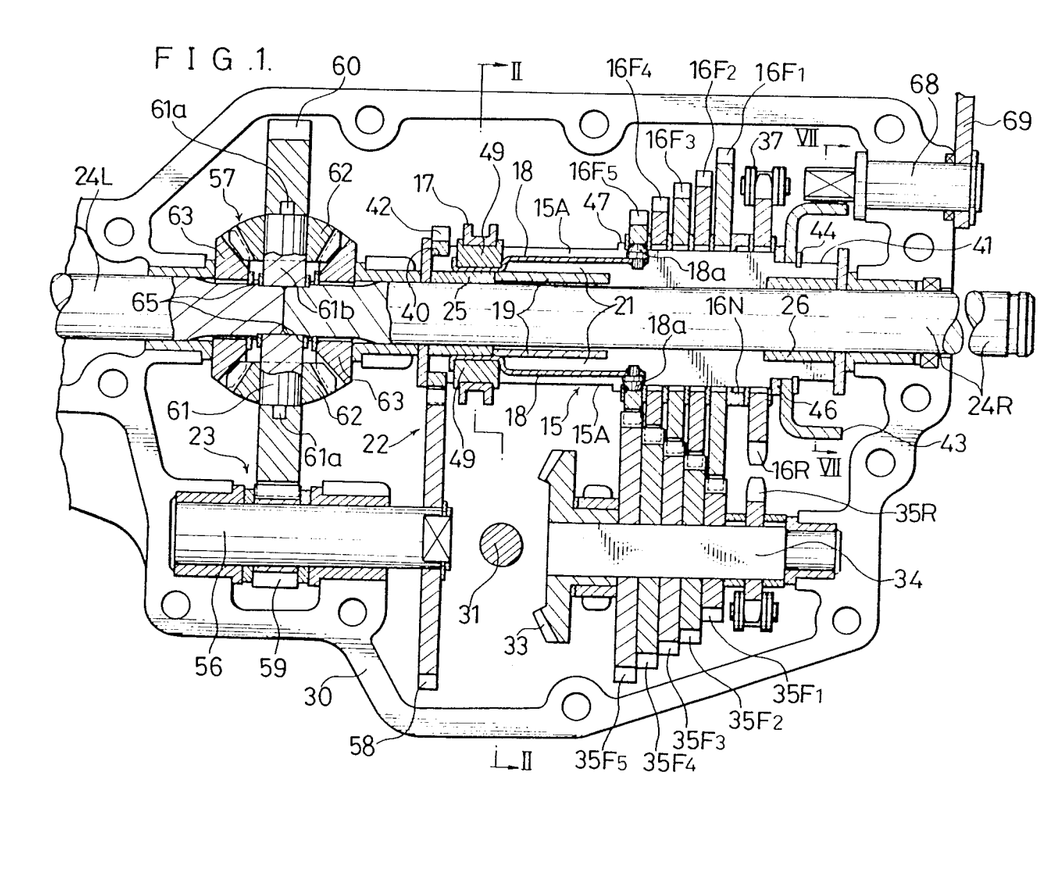
FIG. 1 is a sectional plane view of a vehicle transmission casing in which a first embodiment of the present invention is provided.
Figures 10, 11:
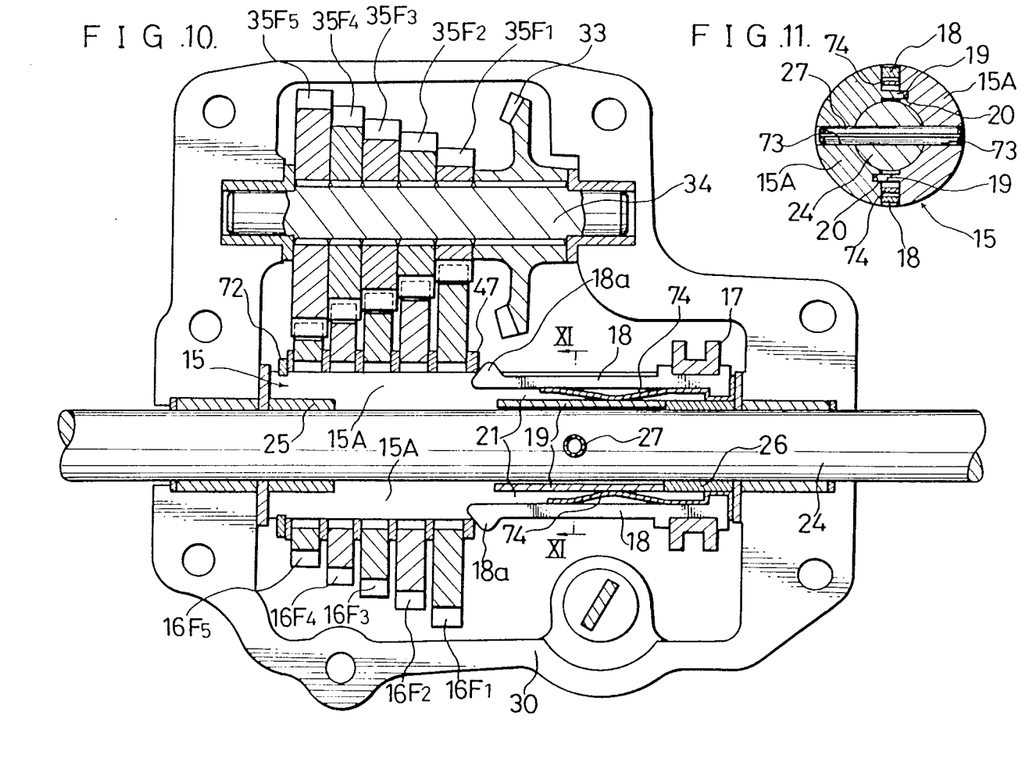
FIG. 10 is a sectional plane view of a vehicle transmission casing in which a second embodiment of the present invention is provided.
FIG. 11 is a sectional view taken along line XI—XI of FIG. 10.

The present invention relates to a key-shift transmission which comprises, as shown respectively in FIG. 1 and in FIG. 10, a speed-change shaft 15, a plurality of speed-change gears $16F_1$, $16F_2$, $16F_3$, $16F_4$ and $16F_5$ rotatably mounted on the speed-change shaft 15, a shifter sleeve 17 slidably mounted on the speed-change shaft 15, and shift keys 18 co-slidably connected to the shifter sleeve 17 and operable to couple the speed-change gears $16F_1$–$16F_5$ one at a time to the speed-change shaft 15.

According to the present invention, the speed-change shaft 15 is divided into a pair of trough-shaped shaft halves 15A each having an arched inner surface which defines a part of a cylindrical bore extending axially through the speed-change shaft. The change shaft 15 is thus formed into a hollow shaft.

Figure 3:
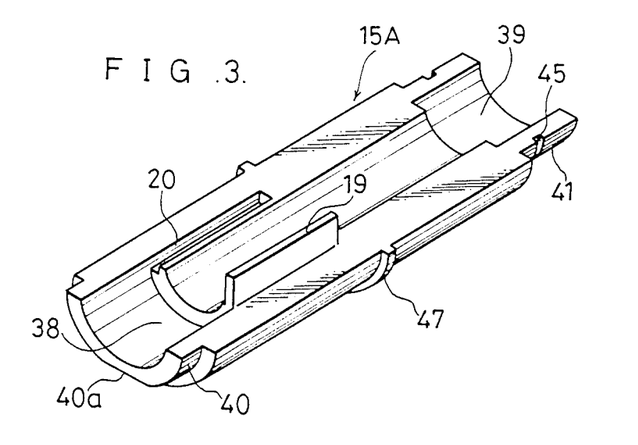
FIG. 3 is a perspective view of one of shaft halves composing a speed-change shaft shown in FIGS. 1 and 2.
Figure 12:
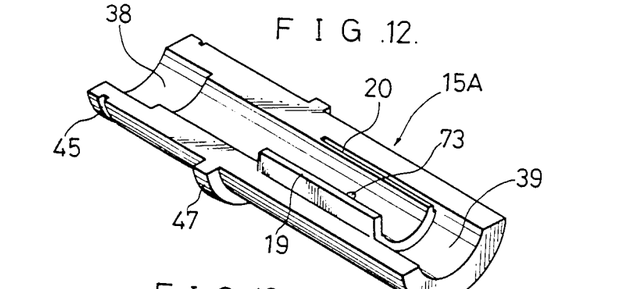
FIG. 12 is a perspective view of one of shaft halves composing a speed-change shaft shown in FIGS. 10 and 11.

As clearly shown respectively in FIG. 3 and in FIG. 12, each shaft half 15A includes a pair of flattened end surfaces which extend axially of the shaft half at both sides of the arched inner surface. One of such end surfaces has thereon an axially elongated projection 19, whereas the other of the end surfaces has therein an axially elongated recess 20 of a depth smaller than the height of the projection 19.

Figure 2:
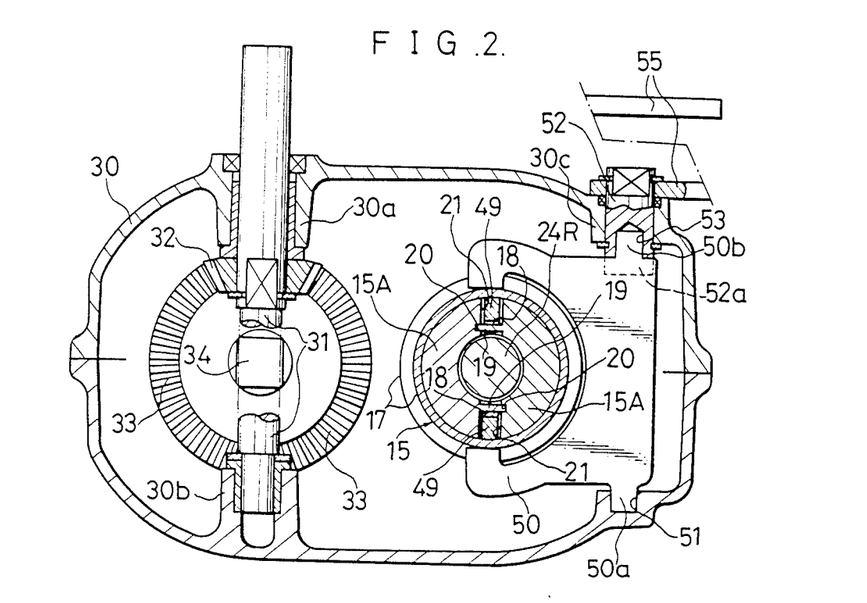
FIG. 2 is sectional side view taken generally along line II—II of FIG. 1.

As shown respectively in FIG. 2 and in FIG. 11, the pair of shaft halves 15A are engaged to each other co-rotatably by fitting the axial projections 19 of the respective shaft halves 15A into the recesses 20 of the respective shaft halves 15A so as to form in an outer surface of the speed-change shaft 15 a pair of elongated axial grooves 21 which are located radially outwardly of the elongated projections 19 of the respective shaft halves 15A and between the flattened end surfaces of the respective shaft halves 15A.

According to the present invention, a pair of the shift keys 18 set forth before are disposed within the pair of elongated axial grooves 21.

The shaft half 15A having an arched inner surface may be manufactured from, for example, a sintered iron alloy using a precision mold casting. The elongated projection 19 and recess 20 can be formed at the same time so that no machining process is required for forming such projection and recess.

The pair of trough-shaped shaft halves 15A, which are engaged to each other co-rotatably by fitting the elongated projections 19 into the elongated recesses 20 so as to form the hollow change shaft 15, are coupled together non-separably when the plurality of speed-change gears $16F_1$–$16F_5$ and shifter sleeve 17 are mounted on the shaft 15.

Each of the elongated axial grooves 21 in the outer surface of speed-change shaft 15 has a bottom surface provided by the outer surface of each elongated projection 19 and inner side wall surfaces provided by the flattened end surfaces of respective shaft halves 15A. Consequently, shift keys 18 disposed within such axial grooves 21 are non-rotatable relative to the change shaft 15 so that such shift keys are operable, as required, to couple the change gears $16F_1$–$16F_5$ non-rotatably to the shaft 15. Each of the shift keys 18 shown is fashioned such that it is in a slidable engagement at a part thereof with the bottom surface of each axial groove 21. The elongated projections 19 and recesses 20 shown are formed to have an axial length which generally covers only a distance of the slidable engagement of shift keys 18 with the bottom surfaces of grooves 21 provided by the outer surfaces of elongated projections 19.

The speed-change shaft 15 which is formed into a hollow shaft achieves a substantial reduction of material for the change shaft so that material cost is largely saved and weight of the change shaft is largely reduced. The elongated projection 19 and recess 20 of each shaft half 15 may be formed at the same time when the shaft half is manufactured using a precision mold casting, as stated before, and the pair of elongated axial grooves 21 are provided when the pair of shaft halves 15A have been engaged or assembled. Consequently, no machining process is required so that production cost for the change shaft is further saved.

The speed-change shaft 15 which is made hollow for a weight-reducing and material-saving purpose may be utilized for a compaction of a vehicle transmission in a fashion, as shown in FIG. 1 by way of example, such that an output shaft 24R extending through such hollow shaft 15 is provided which is drivenly connected to the change shaft via a speed-reduction mechanism 22 and 23.

In the transmission shown in FIG. 1, the output shaft 24R set forth above is, in turn, utilized for supporting the change shaft 15 in a fashion such that the change shaft is rotatably supported by the output shaft through a pair of bearing sleeves 25 and 26 which are spaced from each other axially of the change shaft 15.

In the transmission shown in FIG. 10, an output shaft 24 extending through the speed-change shaft 15 is provided which is coupled non-rotatably to the change shaft using a split pin 27. Provided that the change shaft 15 and output shaft 24 shown in FIG. 10 were formed integrally into a single shaft and elongated axial grooves corresponding to the grooves 21 shown were formed in the outer surface of such single shaft, then the amount of material for the shaft would be increased and a substantial expense would be required for a broaching process.

DESCRIPTION OF PREFERRED EMBODIMENTS

In FIGS. 1 to 7, there is shown a first preferred embodiment of the key-shift transmission according to the present invention which is employed in a small-sized working vehicle (not shown) such as a mower tractor.

In FIGS. 1 and 2, numeral 30 designates a transmission casing which is mounted between left and right drive wheels (not shown) for the vehicle. The output shaft 24R set forth before and another output shaft 24L, coaxially disposed with the former shaft 24R, are used as wheel axles for the drive wheels and extend sidewards from the transmission casing 30.

As shown in FIG. 2, the transmission casing 30 is divided into upper and lower casing halves which include on inner surfaces thereof a pair of cylindrical support portions 30a and 30b having a vertically extending common axis. A vertical input shaft 31 is rotatably supported by these support portions and extends upwardly from the casing 30. On this input shaft 31 is fixedly mounted a bevel gear 32 which is meshed with a larger bevel gear 33 which in turn is mounted non-rotatably on a drive shaft 34 having a square cross-section. The drive shaft extends parallel with the speed-change shaft 15 set forth before. On the drive shaft 34 are further mounted non-rotatably a plurality of drive gears $35F_1$, $35F_2$, $35F_3$, $35F_4$ and $35F_5$ which are meshed respectively with the speed-change gears $16F_1$–$16F_5$ which in turn are mounted rotatably on the change shaft 15, as referred to before. A sprocket gear 35R is also mounted non-rotatably on the drive shaft 34, whereas another sprocket gear 16R is mounted rotatably on the change shaft 15. Over these sprocket gears 35R and 16R is entrained a chain 37.

Figures 4, 5:
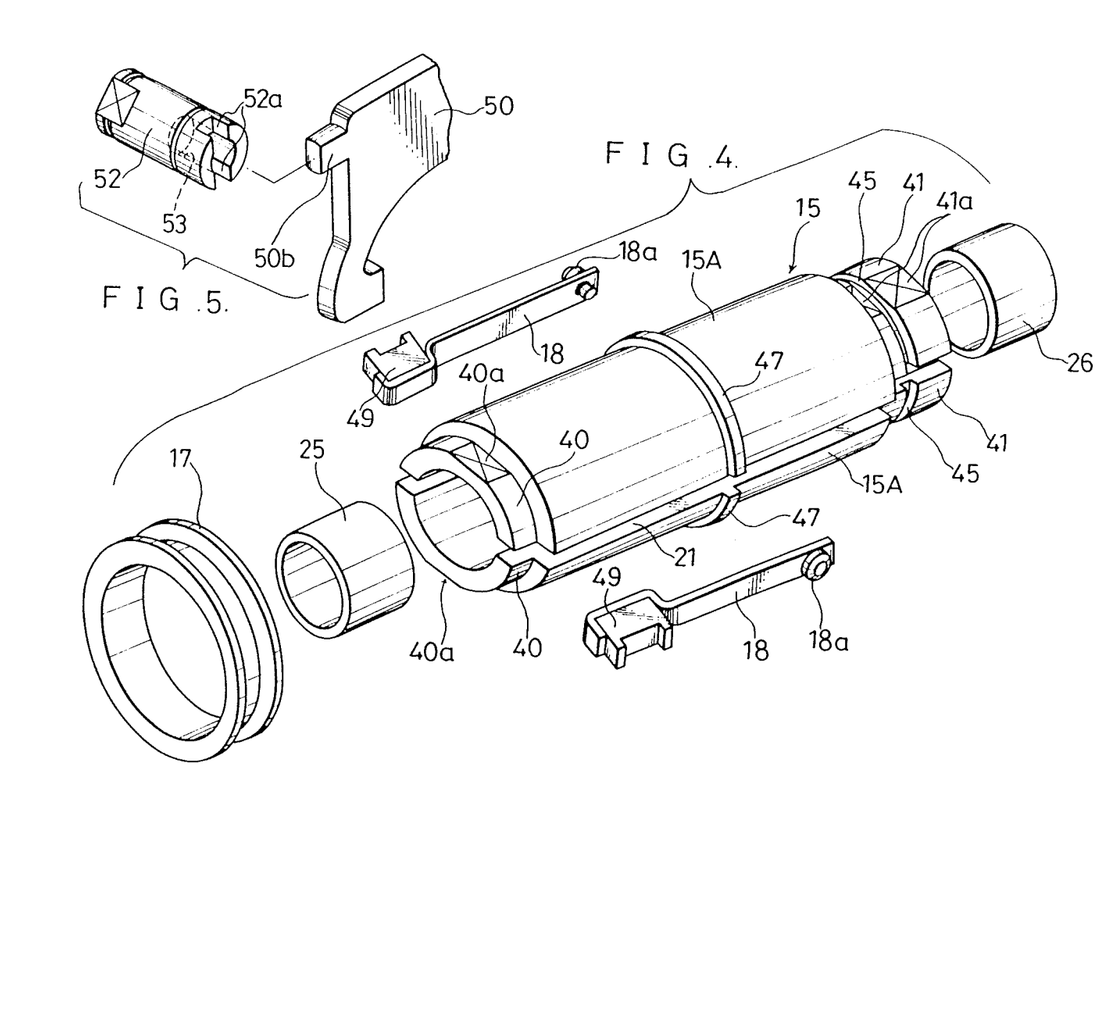
FIG. 4 is a perspective view, showing the speed-change shaft and some members associated thereto shown in FIGS. 1 and 2 in an exploded state.
FIG. 5 is a perspective view, showing a part of a shifting mechanism shown in FIG. 2 in an exploded state.

Structure of the speed-change shaft 15 shown will now be detailed in conjunction with parts and devices associated to such shaft. As shown in FIG. 3, the arched inner surface of each shaft half 15A has at both axial ends thereof a pair of inner diameter-enlarged portions 38 and 39 into which are fitted the pair of bearing sleeves 25 and 26 shown in FIGS. 1 and 4 and referred to before. As shown in FIGS. 3 and 4, each shaft half 15A has at both axial ends thereof outer diameter-reduced portions 40 and 41 on which a pinion gear 42 and brake drum 43 shown in FIG. 1 are fixedly mounted, respectively. A cut-out 40a is provided to the outer diameter-reduced portion 40 for a non-rotatable connection of the gear 42 to the change shaft 15. As shown in FIG. 1, the brake drum 43 is prevented from getting-away using a snap ring 44. This snap ring is fitted at an inner end portion thereof into grooves 45 which are formed, as shown in FIGS. 3 and 4, in the outer surfaces of the outer diameter-reduced portions 41 of shaft halves 15A. On the change shaft 15 are further mounted, as shown in FIG. 1, a neutral position collar 16N, disposed between the change gear $16F_1$ and sprocket gear 16R, and spacer rings disposed between each two adjacent gears. In assembling the transmission, these members and gears $16F_1$–16R are brought onto the change shaft 15 successively from the right end of such shaft, as viewed in FIG. 1, and then a holding ring 46 is employed for holding axial positions of the members and gears set forth above from the side of the brake drum 43. As shown in FIGS. 3 and 4, outer surfaces of the shaft halves 15A have thereon flanged portions 47 which cooperate with the holding ring 46 so as to receive the members and gears set forth above from the opposite side of the brake drum 43.

Figure 8:
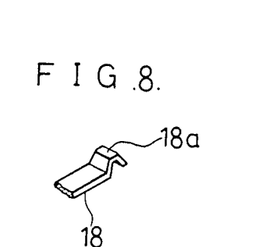
FIG. 8 is a perspective view, showing a part of a shift key which may be substituted for a shift key shown in FIG. 4.

As shown in FIGS. 1 and 4, each of the shift keys 18 employed in the first embodiment is formed of a leaf spring. Such shift key 18 has a generally C-shaped base end at which a holding block 49 is grasped by the key. The holding block includes at its outer surface an integral fork which grips the shifter sleeve 17 set forth before so that the shift key 18 is connected co-slidably to shifter sleeve 17 through the block 49. As is usual, each shift key 18 has at its free end a gear-engaging lug 18a which is formed, in the first embodiment, separately from the leaf spring composing the key and is secured to the key at a pin portion, extending through the key, using a suitable means such as welding. Alternatively, a shift key 18 shown in FIG. 8 may be employed a free end portion of which is deformed so as to form an integral gear-engaging lug 18a. Shift key 18 is biased by its own resiliency to move in a direction such that the gear-engaging lug 18a is projected outwardly of the change shaft 15.

For operating the shifter sleeve 17 to slide on the speed-change shaft 15, a shifter fork 50 shown in FIG. 2 is provided which is supported by the transmission casing 30 rotatably about a vertical axis and is engaged to the shifter sleeve from one side of such sleeve 17. As shown in FIGS. 2 and 5, the shifter fork 50 is fashioned such that it is made from a plate material using a punching process and has lower and upper end projections 50a and 50b which are received respectively in a receiving bore 51 in the inner bottom surface of transmission casing 30 and in a receiving bore 53 in a control shaft 52 which in turn is rotatably received by a cylindrical portion 30c provided to the top wall of casing 30. As shown in FIG. 5 with respect to one of the end projections 50b, each of the projections 50a and 50b includes two arched opposite surfaces so as to be received rotatably in each of the receiving bores 51 and 53. An inner end portion of the control shaft 52 includes a pair of opposed cut-outs 52a each of which has an axial length or depth smaller than that of the receiving bore 53 and an inner width corresponding to thickness of the shifter fork 50. An upper end portion of the shifter fork adjacent to the upper end projection 50b is fittingly received in the cut-outs 52a so that the fork 50 is engaged at such upper end portion non-rotatably to the control shaft 52. To an outer end portion of the control shaft 52 is attached a control arm 55.

As shown in FIG. 1, an intermediate shaft 56 is journalled in the transmission casing 30 in a fashion such that this shaft 56 is disposed generally coaxially with and spaced from the drive shaft 34 with the input shaft 31 therebetween. Between the output shafts 24L and 24R is interposed a differential gearing 57. The speed-reduction mechanism referred to before comprises a first speed-reduction gearing 22, having the pinion gear 42 set forth before and a larger gear 58 which is fixedly mounted on one end portion of the intermediate shaft 56 and is meshed with the pinion gear, and a second speed-reduction gearing 23 having a pinion gear 59 fixedly mounted on a mid portion of the intermediate shaft 56 and a larger gear 60 which constitutes an input gear of the differential gearing 57 and is meshed with the last-mentioned pinion gear 59.

Figure 6:
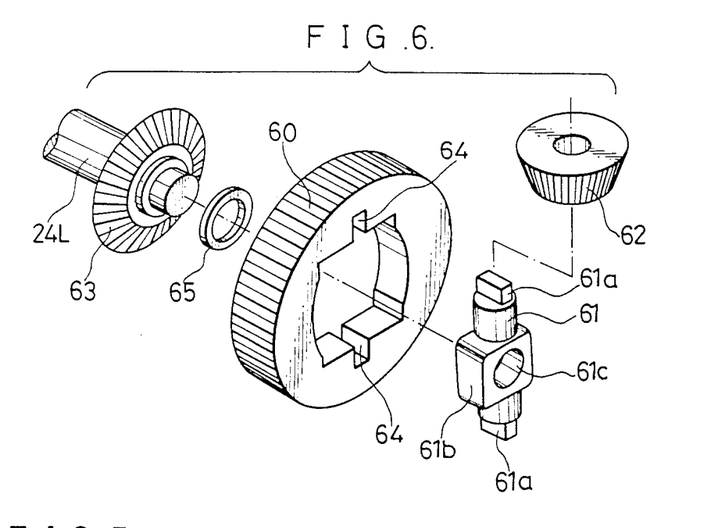
FIG. 6 is a perspective view, showing some members of a differential gearing shown in FIG. 1 in an exploded state.

As is usual, the differential gearing 57 referred to above comprises a pair of drive pinions 62, mounted on a pinion shaft 61, and a pair of driven pinions 63 mounted on the left and right output shafts 24L and 24R. The drive and driven pinions 62 and 63 are meshed in a conventional fashion as shown in FIG. 1, but a differential casing which is employed in a conventional differential gearing is eliminated. As shown in FIG. 6, the input gear 60 set forth above includes therein a central bore which has at the circumference thereof a pair of oppositely disposed square recesses 64. The pinion shaft 61 has a pair of squared end portions 61a which are tightly fitted into the recesses 64 using a shrink fit or the like so that such pinion shaft 61 rotates in unison with the input gear 60. The pinion shaft 61 includes a square-shaped mid portion 61b through which a circular bore 61c extends. Inner end portions of the left and right output shafts 24L and 24R are rotatably received in the bore 61c. A thrust washer 65 is interposed between the mid portion 61b of pinion shaft 61 and each driven pinion 63.

Figure 7:
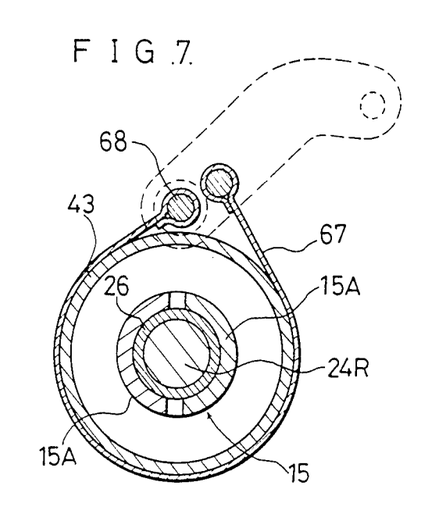
FIG. 7 is a sectional view taken along line VII—VII of FIG. 1.

The brake drum 43 set forth before is non-rotatably connected to the change shaft 15. For such connection, each shaft half 15 has at the outer diameter-reduced portion 41 thereof a cut-out 41a shown in FIG. 4. As shown in FIG. 7, a brake band 67 is wound around the brake drum 43. For tightening the band 67 against the brake drum so as to brake the change shaft 15, a rotatable brake control shaft 68 is provided which extends, as shown in FIG. 1, through a side wall of the transmission casing 30. To an outer end portion of the control shaft 68 is attached a brake arm 69.

As is conventional, each of the speed-change gears 16F$_1$–16F$_5$ and sprocket gear 16R on the change shaft 15 includes at the inner circumference thereof recesses into which the gear-engaging lugs 18a of shift keys 18 may project so as to couple the gear to the change shaft. The neutral position collar 16N referred to before includes at the inner circumference thereof an annular recess in which the gear-engaging lugs 18a may rest at a neutral condition of the key-shift transmission. Shifting operation is carried out by a change lever (not shown) so as to rotate the shifter fork 50 shown in FIG. 2 through the control arm 55 and control shaft 52. By such operation, the shifter sleeve 17 is displaced axially of the change shaft 15 so as to couple a selected gear to the shaft 15. First to fifth forward direction speeds may be obtained selectively by coupling the change gears 16F$_1$–16F$_5$ to the shaft 15, whereas a low backward direction speed may be obtained by coupling the sprocket gear 16R to the change shaft.

Brake comprising the brake drum 43 and brake band 67 referred to before requires no brake casing because it is disposed within the transmission casing 30. Such brake may also be operated with ease because it brakes the change shaft 15 having a relatively small torque which is then hightened by the first and second speed-reduction gearings 22 and 23.

Both end portions of each of the drive shaft 34, intermediate shaft 56 and output shafts 24L, 24R are supported by the transmission casing through bearing sleeves embraced between upper and lower halves of the casing 30. In the transmission shown in FIG. 1, the drive shaft 34 and intermediate shaft 56 are arranged generally coaxially with each other and the output shafts 24L, 24R and hollow change shaft 15 are arranged coaxially. It is thus seen that, although the intermediate shaft 56 is employed for the purpose of providing first and second speed-reduction gearings 22 and 23 and a differential gearing 57, the transmission shown has a small width in the direction across the shafts 15, 24L, 24R, 34 and 56. The transmission casing 30 shown may have a small width correspondingly.

Figure 9:
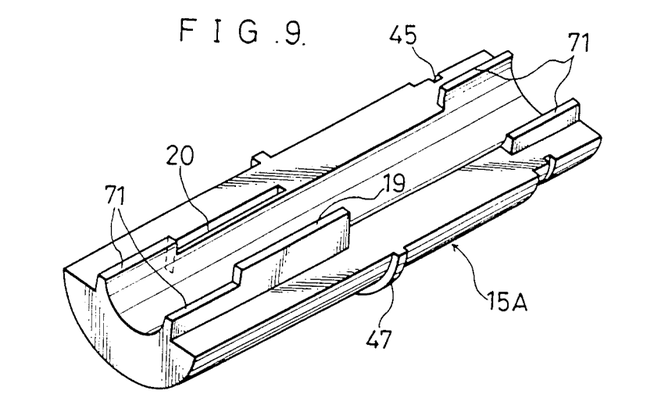
FIG. 9 is a perspective view of a modification of the shaft half shown in FIG. 3.

FIG. 9 depicts a modified shaft half 15A.

In this modification, each of a pair of the flattend end surfaces further has thereon a pair of second projections 71 at both end portions of the shaft half 15A. Such second projections 71 of the respective shaft halves 15A are adapted to provide a pair of uninterrupted annular inner surface portions to the change shaft in cooperation with the arched inner surfaces of the respective shaft halves 15A. That is, each of the second projections 71 is shaped such that the shaft half 15A has a semicircular inner surface at the end portion where each second projection 71 is formed. The inner diameter-enlarged portions 38 and 39 referred to before with respect to the shaft half shown in FIG. 3 are not provided to the shaft half 15A shown in FIG. 9. The annular inner surface portions provided by the second projections 71 of the respective shaft halves 15A are intended to use for bearing surfaces of the speed-change shaft in place of the bearing sleeves 25, 26 shown in FIG. 1.

FIGS. 10 to 12 depict a second embodiment of the present invention which is intended to employ in a self-propelled walking mower. Transmission casing 30 shown in FIG. 10 supports rotatably the output shaft 24, set forth before, which is used as a wheel axle for left and right drive wheels (not shown) in a walking mower.

As a simplified transmission for walking mowers, no backward direction transmission train is disposed between the drive shaft 34 and speed-change shaft 15. The output shaft 24 extending through the hollow change shaft 15 is coupled non-rotatably to the change shaft, as set forth before. No brake is provided.

In this second embodiment, too, the hollow speed-change shaft 15 is composed of a pair of trough-shaped shaft halves 15A each of which is generally similar, as shown in FIG. 12, to that for the first embodiment. Groove 45 shown in FIG. 12, which corresponds to the aforementioned groove 45 shown in FIG. 3, is used for holding a snap ring 72 shown in FIG. 10 which is fixedly provided on the change shaft 15 for preventing axial displacement of the change gears 16F$_1$–16F$_5$ at the opposite side of flanged portions 47 of the respective shaft halves 15A. Each shaft half 15A includes a bore 73 for passing the split pin 27 set forth before. In the transmission shown in FIG. 10, the output shaft 24 is driven directly by the change shaft 15 and no brake is provided so that outer diameter-reduced portions corresponding to those 40 and 41 shown in FIGS. 3 and 4 are not provided to the shaft half 15A shown in FIG. 12.

As shown in FIG. 10, shift keys 18 employed in the second embodiment are connected directly to the shifter sleeve 17. Such shift keys 18 are biased by separate leaf springs 74 which are disposed within the elongated axial grooves 21 and are attached at base ends thereof to base end portions of the shift keys 18. Each shift key 18 has an integrally formed gear-engaging lug 18a. Each of the bevel gear 33 and drive gears 35F$_1$–35F$_5$ is fixedly mounted on the drive shaft 34 using a splined connection.

The other parts of the second embodiment are fashioned similarly as the corresponding parts of the first embodiment and are designated by like numerals.

Figure 13:
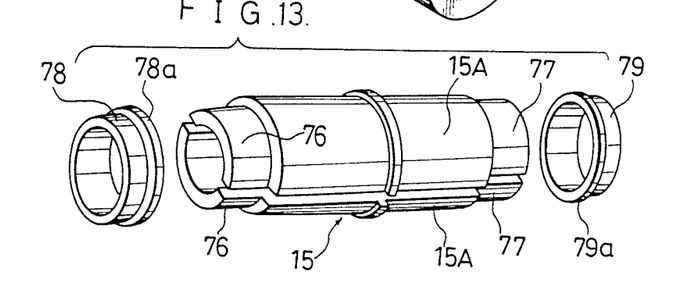
FIG. 13 is a perspective view, illustrating in an exploded state an example of structures for supporting the speed-change shaft according to the present invention at outer surface portions of the shaft.

In each of the embodiments having been detailed hereinbefore, the hollow speed-change shaft 15 composed of a pair of shaft halves 15A is supported at inner surface portions of the shaft 15. Such hollow speed-change shaft may also be supported at outer surface portions of the shaft. FIG. 13 illustrates an example of structures for such supporting.

In the structure shown in FIG. 13, each of the shaft halves 15A includes at both end-portions thereof a pair of outer diameter-reduced portions 76 and 77 which are similar to the outer diameter-reduced portions 40 and 41 shown in FIGS. 3 and 4. A pair of bearing sleeves 78 and 79 are provided which are disposed on the portions 76 and 77, respectively, of the shaft halves 15A. The speed-change shaft 15 shown in FIG. 13 is fashioned such that it is journalled in a transmission casing through the bearing sleeves 78 and 79. Each of the bearing sleeves includes thereon an annular flange 78a, 79a which abuts on an inner side wall of the transmission casing when the change shaft 15 is journalled.

I claim:

1. A key-shift transmission which comprises a speed-change shaft, a plurality of speed-change gears rotatably mounted on said speed-change shaft, a shifter sleeve slidably mounted on said speed-change shaft, and shift keys co-slidably connected to said shifter sleeve and operable to couple said speed-change gears one at a time to said speed-change shaft, characterized in:

that said speed-change shaft (15) is divided into a pair of trough-shaped shaft halves (15A) each having an arched inner surface which defines a part of a cylindrical bore extending axially through said speed-change shaft thereby the said shaft being formed into a hollow shaft, each of said shaft halves including a pair of flattened end surfaces which extend axially of each said shaft half at both sides of said inner surface, one of said end surfaces having thereon an axially elongated projection (19) and the other of said end surfaces having therein an axially elongated recess (20) of a depth smaller than the height of said projection, said pair of shaft halves being engaged to each other co-rotatably by fitting said projections of the respective shaft halves into said recesses of the respective shaft halves so as to form in an outer surface of said speed-change shaft a pair of elongated axial grooves (21) which are located radially outwardly of said elongated projections of the respective shaft halves and between said flattened end surfaces of the respective shaft halves; and that a pair of said shift keys (18) are disposed within said pair of elongated axial grooves (21).

2. A key-shift transmission as set forth in claim 1, wherein an output shaft (24R) extending through said speed-change shaft (15) is provided which is drivenly connected to the said speed-change shaft via a speed-reduction mechanism (22, 23).

3. A key-shift transmission as set forth in claim 2, wherein said speed-change shaft (15) is rotatably supported by said output shaft (24R) through a pair of bearing sleeves (25, 26) which are spaced from each other axially of said speed-change shaft.

4. A key-shift transmission as set forth in claim 2, wherein each of said end surfaces of each said shaft half (15A) further has thereon a pair of second projections (71) at both end portions of each said shaft half, said second projections of the respective shaft halves being adapted to provide a pair of uninterrupted annular inner surface portions to said speed-change shaft (15) in cooperation with said arched inner surfaces of the respective shaft halves.

5. A key-shift transmission as set forth in claim 1, wherein an output shaft (24) extending through said speed-change shaft (15) is provided which is coupled non-rotatably to said speed-change shaft.

* * * * *